(12) United States Patent
Gavin et al.

(10) Patent No.: US 6,705,945 B2
(45) Date of Patent: Mar. 16, 2004

(54) PROVIDING GAME INFORMATION VIA CHARACTERS IN A GAME ENVIRONMENT

(75) Inventors: Andrew Scott Gavin, Pacific Palisades, CA (US); Evan Lindsay Wells, Venice, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 0 days.

(21) Appl. No.: 10/268,278

(22) Filed: Oct. 9, 2002

(65) Prior Publication Data

US 2003/0109305 A1 Jun. 12, 2003

Related U.S. Application Data

(60) Provisional application No. 60/328,458, filed on Oct. 10, 2001, and provisional application No. 60/328,482, filed on Oct. 10, 2001.

(51) Int. Cl.[7] .................................................. A63F 13/00
(52) U.S. Cl. ............................. 463/31; 463/35; 463/1; 463/4; 273/461; 273/108.1; 273/108.2; 273/108.4
(58) Field of Search ............................. 463/31, 35, 43, 463/30, 32, 33, 1, 2–8; 273/317.1, 317, 351, 381, 378, 459–461, 108, 108.1; 345/716, 473, 727, 978; 352/5, 198; 434/323

(56) References Cited

U.S. PATENT DOCUMENTS

| | | | | |
|---|---|---|---|---|
| 4,569,026 A | | 2/1986 | Best | |
| 4,752,069 A | | 6/1988 | Okada | |
| 5,377,997 A | * | 1/1995 | Wilden et al. | 463/43 |
| 5,498,002 A | * | 3/1996 | Gechter | 463/31 |
| 5,649,861 A | * | 7/1997 | Okano et al. | 463/30 |
| 5,704,837 A | * | 1/1998 | Iwasaki et al. | 463/38 |
| 5,977,968 A | * | 11/1999 | Le Blanc | 345/706 |
| 6,428,411 B1 | * | 8/2002 | Togami | 463/4 |
| 6,582,309 B2 | * | 6/2003 | Higurashi et al. | 463/31 |

* cited by examiner

*Primary Examiner*—Teresa Walberg
*Assistant Examiner*—Yveste G Cherubin
(74) *Attorney, Agent, or Firm*—Carr & Ferrell LLP

(57) ABSTRACT

Providing game information via character in a game environment comprises monitoring a position of a character in the game environment, providing visual information to the user based on the position of the character in the game environment, the visual information being presented as a modification of the character, and providing audio information to the user based on the position of the character in the game environment, the audio information being presented as statements from another character. A visual information module visually provides game information to the user within the context of the game environment and an audio information module audibly provides game information to the user within the context of the game environment.

26 Claims, 6 Drawing Sheets

PROVIDING GAME INFORMATION VIA CHARACTERS IN A GAME ENVIRONMENT

CROSS REFERENCE TO RELATED APPLICATIONS

This application is related to, and claims the benefit of, U.S. Provisional Patent Application No. 60/328,458, entitled "System and Method for Providing Game Information via Main Character Actions," filed on Oct. 10, 2001, and U.S. Provisional Patent Application No. 60/328,482, entitled "Companion Character Interaction with Main Character in a Game Environment," filed on Oct. 10, 2001. The subject matter of the related applications is hereby incorporated by reference.

BACKGROUND OF THE INVENTION

1. Field of the Invention

This invention relates generally to electronic entertainment devices and relates more particularly to providing information via characters in a game environment.

2. Description of the Background Art

In electronic games, onscreen indicators are often used to provide information to a user. For example, cross-hairs may be used as an aid in aiming a weapon, floating objects or symbols may indicate the location of a hidden object, or arrows may point to the location of a target or indicate a desired direction of travel. These indicators may provide game performance data, indications, warnings, or some other type of on-screen information. Other examples of onscreen indicators may represent life or lives remaining, amount of strength or magic power, number of points accumulated, amounts of ammunition, types of weapons, completion of objectives, or number and type of objects gathered.

Such onscreen indicators provide useful information to a user; however, onscreen indicators are extraneous to the game environment, which typically represents some type of virtual world. Cluttering the screen with numerous indicators may distract the user from the virtual world of the game. Typically a user's focus is on the main character that he or she is controlling. To observe most commonly-used onscreen indicators, the user must shift his or her focus away from the main character. This may result in distractions that detract from the user's enjoyment of the game, subsequently resulting in less appeal of a particular game. This in turn affects the commercial success and desirability of a particular game.

In a game environment, the user typically controls the actions of a main character. The main character interacts with the game environment in various ways, for example, exploring the landscape, fighting enemies, collecting objects, or solving puzzles. The main character typically has one or more objectives to accomplish in order for the user to complete the game. In some games, other characters provide information to the main character via on-screen text boxes. In these games, the game play pauses while a caption appears on the screen with a text message for the main character. The user typically has to perform an action (e.g., press a button) to close the caption screen and continue game play. In some instances the user also must perform an action to initiate a "conversation" with another character. Interacting with game characters may obstruct a user's view of his main character. Similarly, on-screen presentation of game data or information to a user may obstruct view of the primary game action or even reduce the user's ability to complete objectives.

There are numerous problems with the conventional types and methods by which game information is presented to users. Obstructing views and perspectives in the game environment and inhibiting the user's ability to accomplish game objectives reduce the user's enjoyment and a particular video game's appeal. Therefore, there is a need for providing information to users without incurring conventional problems associated with degrading the user experience and enjoyment of a game environment.

SUMMARY OF THE INVENTION

In accordance with the invention, a system and method are disclosed to implement providing game information via characters in a game environment. In one embodiment, the system of the invention includes a visual information module and an audio information module. The visual information module visually provides information via game characters, including a main character controlled by a user. In one embodiment, the visual information module monitors the position of the character in the game environment and visually provides game information to the user based on the position. In one embodiment, the visual information module provides game information by modifying a component of the character not under control of the user.

In one embodiment, the method of the invention includes monitoring a position of a character in the game environment, providing visual information to the user based on the position of the character in the game environment, the visual information being presented as a modification of the character, and providing audio information to the user based on the position of the character in the game environment, the audio information being presented as statements from another character.

Game information may include a variety of information such as life or lives remaining, amount of strength or magic power, number of points accumulated, amounts of ammunition, types of weapons, completion of objectives, or number and type of objects gathered. In games that are designed to immerse the user in a simulated or virtual environment, the invention provides timely and useful information to the user through character actions or audio hints. The invention provides information without detracting or distracting the user from the game environment.

DETAILED DESCRIPTION OF THE INVENTION

Figure 1:
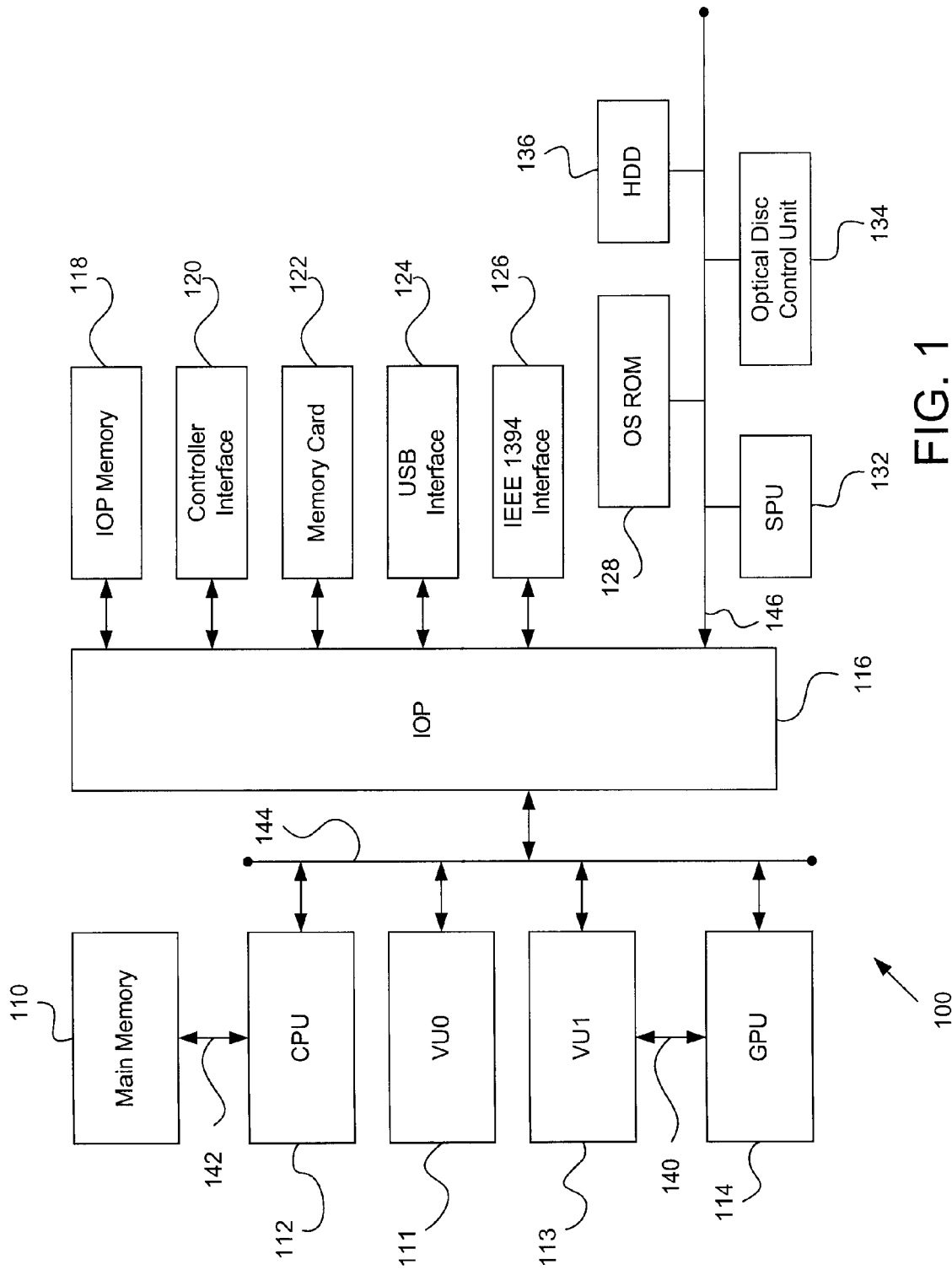
FIG. 1 is a block diagram of one embodiment of an electronic entertainment system, according to the invention.

FIG. 1 is a block diagram of one embodiment of an electronic entertainment system 100 in accordance with the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116. System 100 is preferably an electronic gaming console; however, system 100 may also be implemented as a general-purpose computer, a set-top box, or a hand-held gaming device.

CPU 112, VU0 111, VU1 113, GPU 114, and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain prestored programs and may also contain programs transferred via IOP 116 from a CD-ROM, DVD-ROM, or other optical disc (not shown) using optical disc control unit 134. IOP 116 controls data exchanges between CPU 112, VU0 111, VU1 113, GPU 114 and other devices of system 100, such as controller interface 120.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions and processes data to produce sound signals that are output on an audio device (not shown).

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126.

Figure 2:
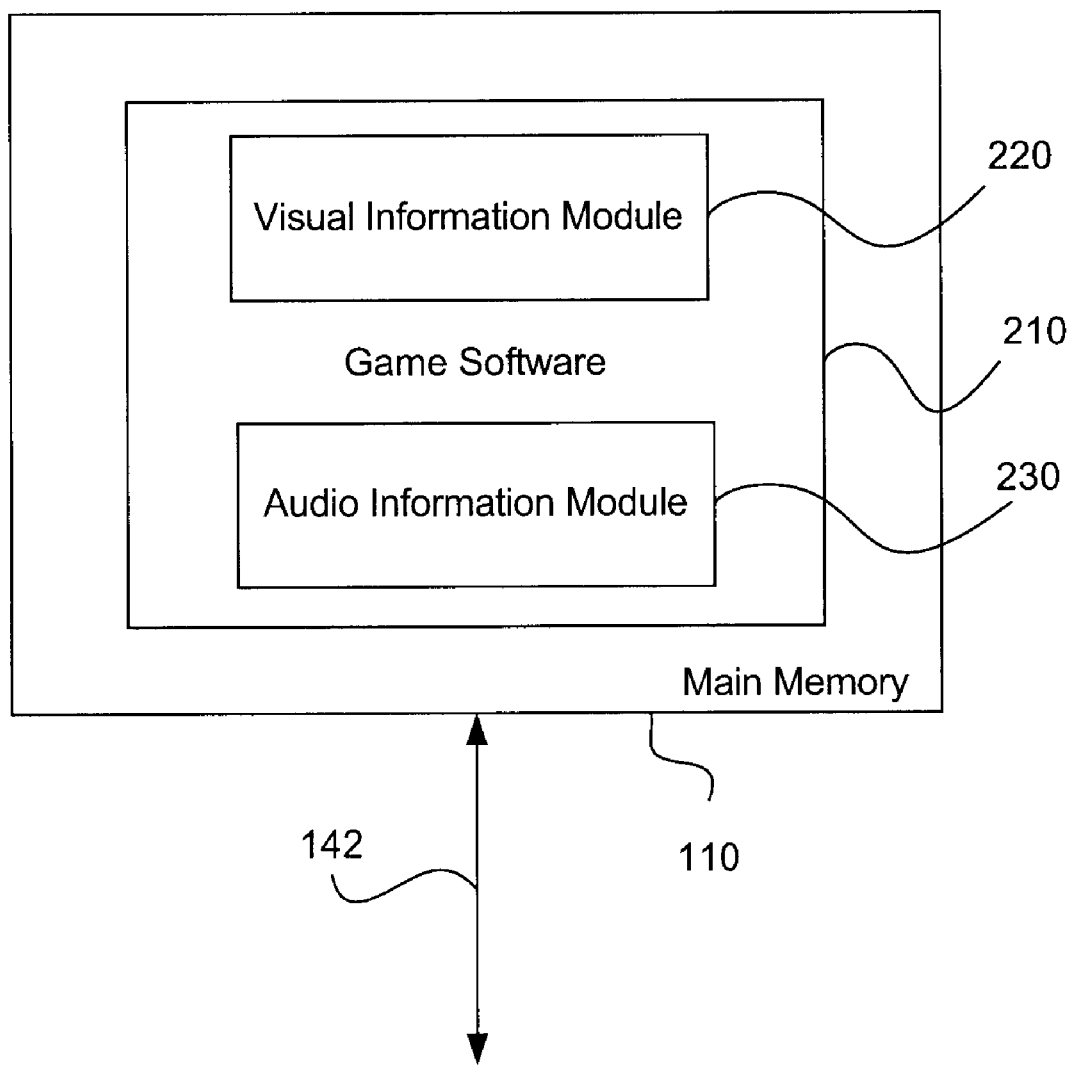
FIG. 2 is a block diagram of one embodiment of the main memory of FIG. 1, according to the invention.

FIG. 2 is a block diagram of one embodiment of main memory 110 of FIG. 1, according to the invention. Main memory 110 includes, but is not limited to, game software 210, which was loaded into main memory 110 from an optical disc in optical disc control unit 134. Game software 210 includes instructions executable by CPU 112, VU0 111, VU1113, and SPU 132 that allow a user of system 100 to play a game. In one embodiment of FIG. 2, game software 210 can be an action-adventure game in which the user controls a main character on a journey. In other embodiments, game software 210 may be any other type of game, for example, a role-playing game (RPG) where the character is tasked to perform a number of actions or achieve a series of goals, a flight simulation game, or a civilization-building simulation game.

Game software 210 includes, but is not limited to, a visual information module 220 and an audio information module 230. Visual information module 220 is configured to visually provide game information to a user within the context of the game environment. In one embodiment, visual information module 220 modifies some portion of a main character of the game that the user does not control to provide game information to the user. The functionality of visual information module 220 is further discussed below in conjunction with FIGS. 3A and 4. Audio information module 230 is configured to audibly provide game information to the user within the context of the game environment. In one embodiment, audio information module 230 initiates playback of prerecorded audio signals that represent statements from a character in the game environment to provide game information to the user. The functionality of audio information module 230 is further discussed below in conjunction with FIGS. 3B and 5.

Figure 3A:
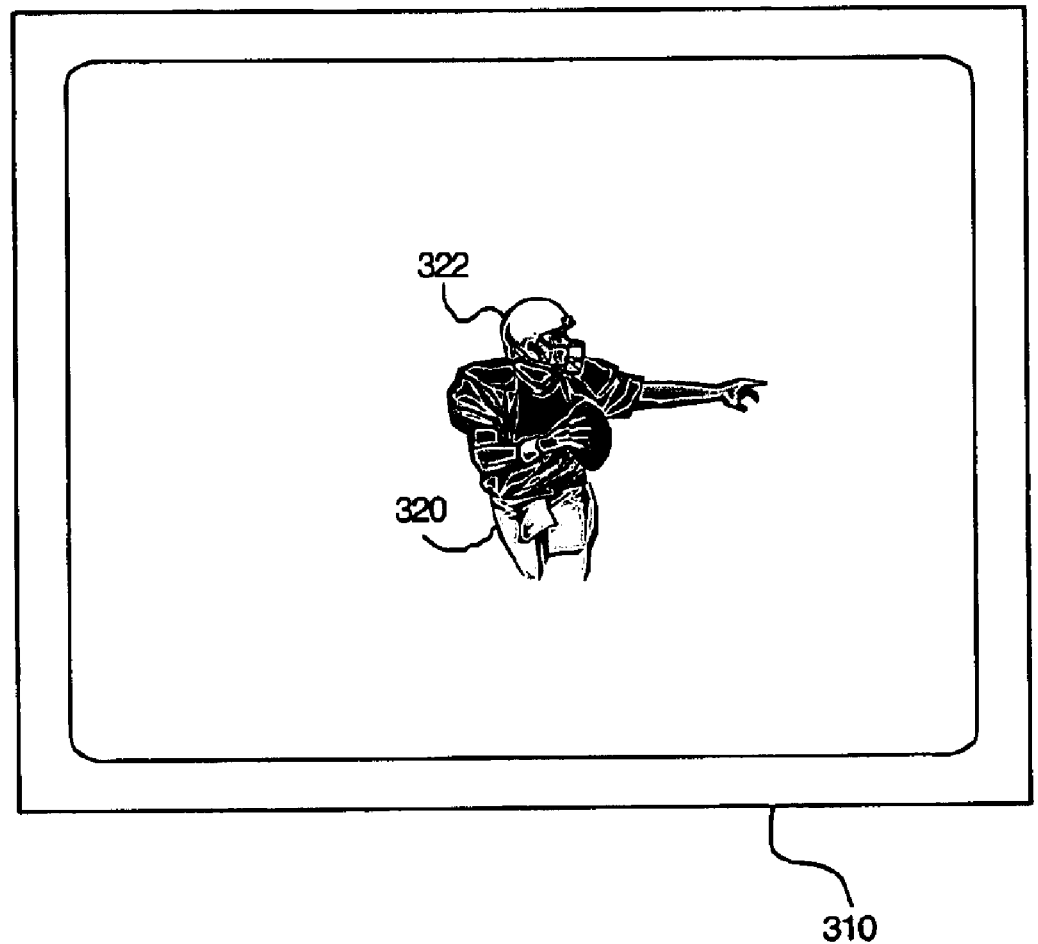
FIG. 3A is a diagram of one embodiment of a main character, according to the invention.

FIG. 3A is a diagram of one embodiment of a main character 320 displayed on a display screen 310, according to the invention. The head is a component of human-like characters that the user typically does not control. The user typically controls other appendages indirectly. For example, the user controls a character's legs when actuating controls for walking, running, and jumping actions. In some games, appendages may be directly controlled. For example, in a fighting game, the user may actuate controls for a left-handed punch or a kick with a right foot.

As shown in FIG. 3A, the body of human-like main character 320 faces in one direction and the head 322 of main character 320 faces in a different direction, which provides game information to the user. For example, head 322 of main character 320 may face in the direction of a closest enemy (which may or may not be visible on screen 310), a desired direction of travel, or the direction of a game objective such as treasure. The range of motion of head 322 is restricted by what would be a realistic range of motion for human-like main character 320. In other embodiments, a fanciful main character, such as a robot, may have a head or other component with an unrestricted range of motion.

During game play, the user's attention is typically on the location and movements of main character 320. The head-turning action of main character 320 advantageously provides game information to the user without extraneous symbols shown on screen 310 and without requiring the user to shift his or her attention from main character 320. Visual information module 220 monitors the position and orientation of main character 320 relative to some object or area of interest in the game environment. When main character 320 is within a specified distance from a predetermined object or area of interest, visual information module 230 signals to game software 210 to modify the orientation of head 322 such that it faces in a direction towards the predetermined object or area of interest.

In other embodiments of the invention, other features of a human-like main character may indicate game information, for instance facial features, ears, and hair. For example, the main character's hair may stand up on end to indicate the proximity of a danger.

The available actions of main character 320 not controlled by the user depends upon the nature of the character. For example, a game character may have a tail, the actions of which are not under control of the user. The direction, size, shape, color, or other configuration of the character's tail, alone or in combination, may be used to provide various types of game information to the user. For instance, the color of the tail can indicate relative strength of the character, and the tail can point in the direction of a sought-for object. Games having very fanciful main characters may have other features or appendages that visual information module 220 can modify to visually provide game information to the user.

Figure 3B:
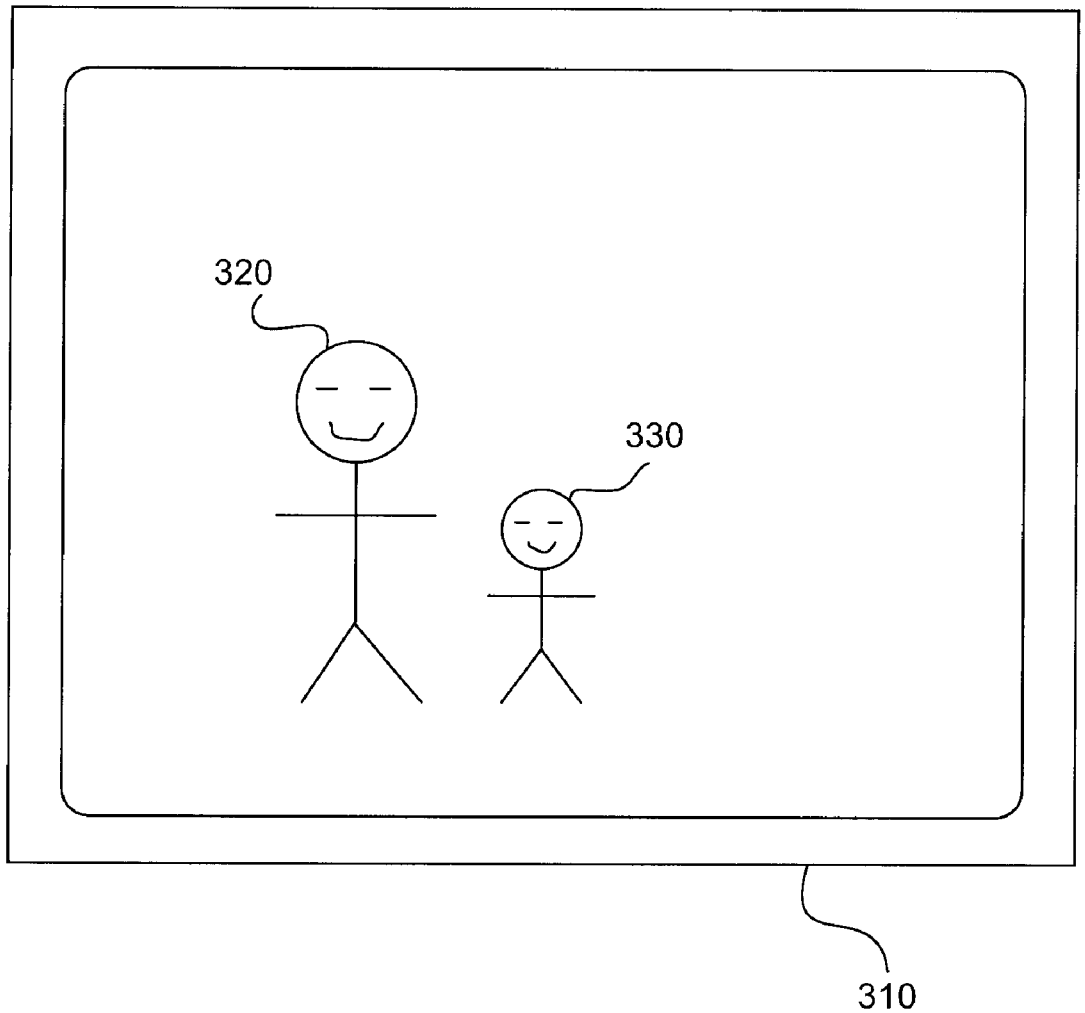
FIG. 3B is a diagram of one embodiment of a main character and a companion character, according to the invention.

FIG. 3B is a diagram of main character 320 and a companion character 330 accompanying main character 320 in the game environment on display screen 310. One or more companion characters 330 may accompany main character 320. Companion character 330 accompanies main character 320 throughout the game environment and provides commentary to the user via audio signals managed by audio information module 230. Companion character 330 may be any type of character, including but not limited to a sidekick, assistant, fire team member, squad member, comrade, apprentice, teacher, guru, pet, or friend. In one embodiment of the invention, companion character 330 travels with main character 320 by sitting on the main character's shoulder or back. Companion character 330 remains in contact with main character 320 while main character 320 runs, jumps, climbs, or fights enemies. Companion character 330 may also appear separated from main character 320 at times, but is always present and visible while main character 330 is shown on screen 310. In another embodiment, companion character 330 is not always present on screen 310 with main character 320 and may communicate with main character 320 via a radio link, mental telepathy, or other remote communication means.

Companion character 330 provides suggestions and information about the game environment to main character 320. Companion character 330 may provide a reminder of a task to be completed, suggest a destination in the game environment, provide information about a place or object, suggest an action that main character 320 might perform, or make a comment about the current game situation. Companion character 330 advantageously provides these suggestions and information by an audio signal processed by SPU 132 (FIG. 1). Audio information module 230 determines when to playback an audio signal and which particular audio signal to play. Audio information module 230 provides instructions to system 100 such that the appropriate audio signal is read from the optical disc in optical disc control unit 134 and processed by SPU 132.

The user hears the comments of companion character 330 without a pause in game play. For example, main character 320 may be running down a path when companion character 330 suggests that main character 320 go off to the left to investigate an object. The user may follow the suggestion and cause main character 320 to approach the object, or the user may ignore the suggestion and cause main character 320 to continue down the path. The user can heed or ignore the information from companion character 330 without interrupting game play. The user continues to cause main character 320 to walk, run, jump, or fight while companion character 330 "speaks" to main character 320. Companion character 330 may also provide commentary that is not informative in nature, for example praise when main character 320 accomplishes a task or reaches a goal, criticism when main character 320 performs an action incorrectly, or jokes about things in the game environment.

While audio information from companion character 330 is being presented to the user, game software 210 does not modify what is being displayed on screen 310 to reflect that companion character 330 is making a statement. Game play continues as usual and no text box transcribing the statement appears on screen 310.

The content of companion character's 330 statements to main character 320 depends upon main character's 320 location in the game environment. Audio information module 230 monitors the location of main character 320 and companion character 330 in the game environment. Audio information module 230 determines whether audio information is appropriate based on the position of main character 320 in the game environment. For example, audio information module 230 causes companion character 330 to provide certain information about an object when main character 320 is in the vicinity of that object.

The content of companion character's 330 statements may also depend upon the elapsed time in the game. For example, if main character 320 needs to complete a task or reach a goal by a certain time period, companion character 330 may provide this information or a reminder of the deadline. Companion character 330 may also provide information or suggestions when the main character 320 enters a new level or area of the game environment, for example information about a goal to be achieved in a particular area.

The content and timing of companion character's 330 statements may also depend upon actions by the user in controlling the actions of main character 320. For example, if main character 320 fails to complete an objective more than a predetermined number of times, audio information module 230 initiates playback of an audio hint from companion character 330 that provides information to the user helpful in completing the objective. If main character 320 continues to fail to complete the objective, audio information module 230 initiates playback of another audio hint from companion character 330 that provides more detailed information than previous audio hints. In another example, if main character 320 completes an objective within a predetermined time period or within a predetermined number of attempts, audio information module 230 provides no audio information to the user. Thus audio information module 230 provides audio information that is relevant to a current situation of main character 320.

In one embodiment, game software 210 is configured to allow the user to disable audio information module 230 if the user does not want to hear audio information from companion character 330. Game software 210 may offer this option to the user via a set up or options screen accessible to the user at any time during game play. In one embodiment, game software 210 is configured to allow the user to disable visual information module 220 if the user does not want to receive visual information from main character 320. Game software 210 also may offer this option to the user via a set up or options screen accessible by the user at any time during game play.

In one embodiment of the invention, audio signals of the statements of companion character 330 are pre-recorded and then digitally stored on an optical disc with game software 210 and other audio signals such as background music. Audio information module 230 includes a listing of all available pre-recorded audio signals that represent statements of companion character 330.

Figure 4:
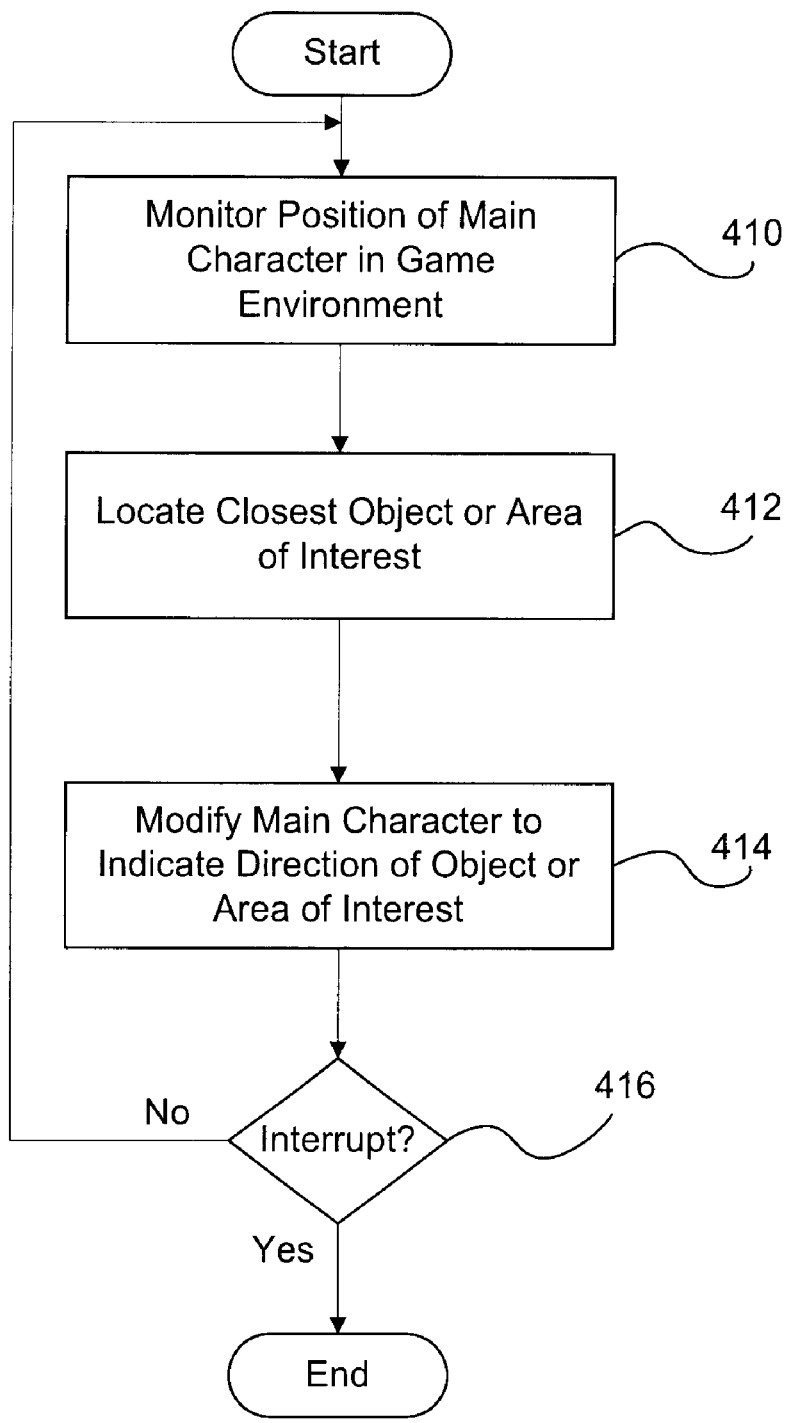
FIG. 4 is a flowchart that illustrates a method for providing visual game information via a character in a game environment, according to one embodiment of the invention.

FIG. 4 is a flowchart that illustrates a method for providing visual game information via a character in a game environment, according to one embodiment of the invention. In step 410, visual information module 220 monitors the position of main character 320 in the game environment. In step 412, visual information module 220 locates an object or area of interest in the game environment that is closest to main character 320. In other embodiments, visual information module 220 may locate an object or area of interest in the game environment according to other criteria, for example locating an object of the greatest importance.

In step 414, visual information module 220 modifies a component of main character 320 to indicate the direction towards the object or area of interest. In one embodiment, visual information module 220 modifies the orientation of a head of a human-like main character to indicate the direction of interest. In other embodiments, other components of different types of characters may be modified to provide visual information regarding the direction of interest. In step 416, visual information module 220 determines whether an interrupt occurs. An interrupt may occur when the user pauses, restarts, or terminates game play. If an interrupt does not occur, the method returns to step 410. If an interrupt does occur, the method ends and will restart when game play resumes.

Figure 5:
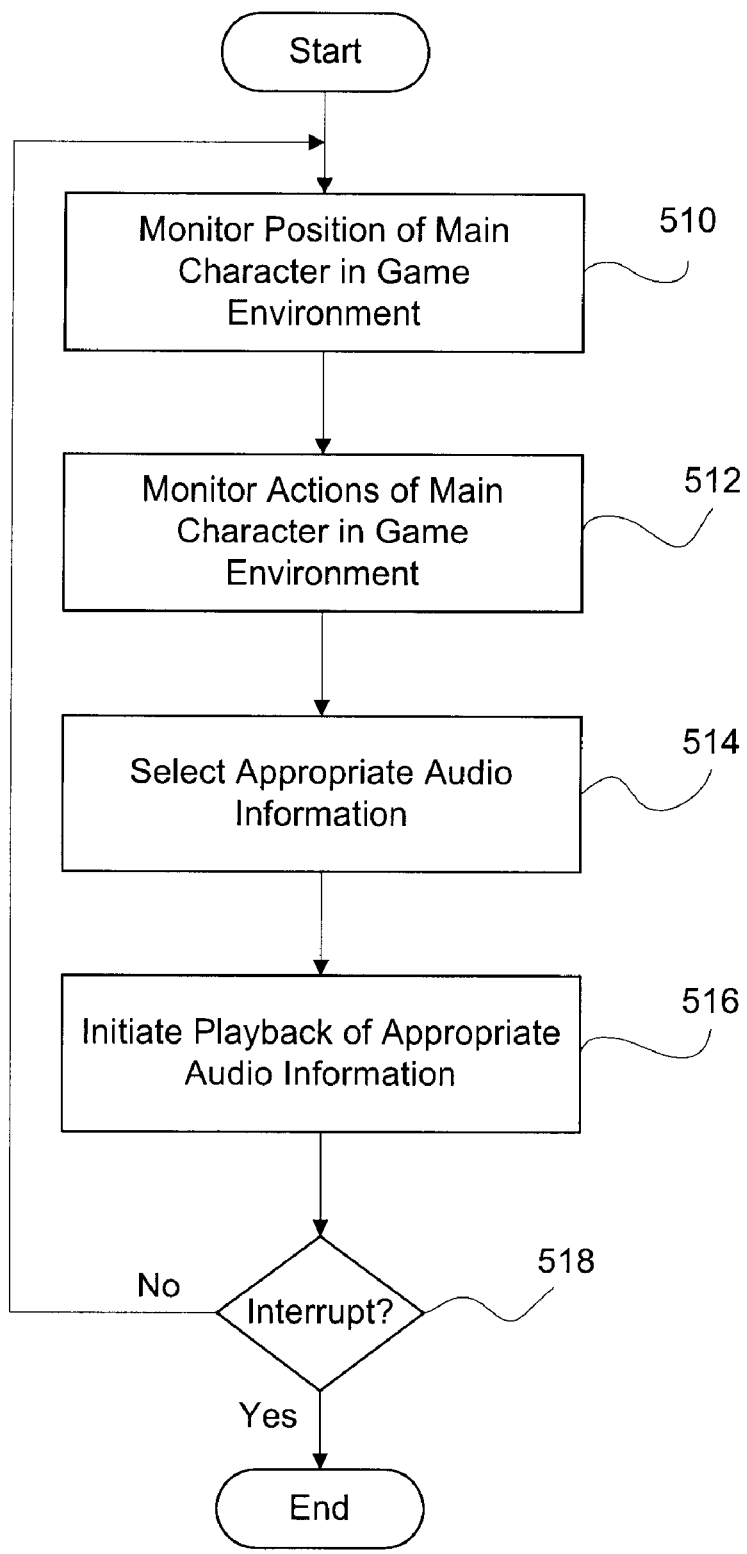
FIG. 5 is a flowchart that illustrates a method for providing audio game information via a character in a game environment, according to one embodiment of the invention.

FIG. 5 is a flowchart that illustrates a method for providing audio game information via a character in a game environment, according to one embodiment of the invention. In step 510, audio information module 230 monitors the position of main character 320 in the game environment. In step 512, audio information module 230 monitors actions of main character 320 in the game environment. In step 514, audio information module 230 selects appropriate audio information based on the position and actions of main character 320. In one embodiment, audio information module 230 selects an audio signal from a set of pre-recorded audio signals stored on an optical disc that also includes game software 210.

In step 516, audio information module 230 initiates playback of the selected audio information. In step 518, audio information module 230 determines whether an interrupt has occurred. An interrupt may occur when the user pauses, restarts, or terminates game play. If an interrupt does not occur, the method returns to step 510. If an interrupt does occur, the method ends and will restart when game play resumes.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for providing game information to a user, comprising:
    monitoring a position of a character in a game environment;
    providing visual information to the user based on the position of the character in the game environment, the visual information being presented as a modification of the character; and
    providing audio information to the user based on the position of the character in the game environment, the audio information being presented as statements from another character.

2. The method of claim 1, wherein the modification of the character includes modifying a direction of orientation of a head of the character within a range of motion appropriate to the character.

3. The method of claim 2, wherein the direction of orientation of the head of the character is modified to face in a direction towards an object of interest.

4. The method of claim 2, wherein the direction of orientation of the head of the character is modified to face in a direction towards an area of interest.

5. The method of claim 1, wherein the other character is a companion to the character that is present with the character throughout the game environment.

6. The method of claim 1, further comprising monitoring actions of the character in the game environment, and the audio information is further based on the actions of the character in the game environment.

7. The method of claim 6, wherein the audio information includes a suggestion to help the user to cause the character to complete an objective.

8. The method of claim 7, wherein the audio information includes a further suggestion to help the user to cause the character to complete the objective if the character fails to complete the objective after a predetermined number of attempts.

9. The method of claim 1, wherein the audio information includes a suggestion to the user to cause the character to enter a different part of the game environment.

10. The method of claim 1, wherein the audio information includes a reminder of a game deadline.

11. A method for providing game information to a user, comprising:
    monitoring a position of a character in a game environment; and
    presenting game information to the user within the context of the game environment without using indicators extraneous to the game environment, the game information based on the position of the character in the game environment.

12. The method of claim 11, wherein the game information includes visual information presented via a game screen.

13. The method of claim 12, wherein the visual information is presented as a modification of a character in the game environment.

14. The method of claim 11, wherein the game information includes audio information that is presented to the user as statements by another character in the game environment.

15. A system for providing game information, comprising:
    game software including:
        a visual information module configured to visually provide information to a user by modifying a character in the game environment, and
        an audio information module configured to audibly provide information to the user by initiating playback of audio signals that represent statements by another character in the game environment.

16. The system of claim 15, wherein the visual information module is further configured to monitor a position of the character in the game environment and modify the character based on the position.

17. The system of claim 15, wherein the visual information module is further configured to modify a direction of orientation of a head of the character within a range of motion appropriate to the character.

18. The system of claim 17, wherein the direction of orientation of the head of the character is modified to face in a direction towards an object of interest.

19. The system of claim 17, wherein the direction of orientation of the head of the character is modified to face in a direction towards an area of interest.

20. The system of claim 15, wherein the visual information module is further configured to modify a component of the character not controllable by the user.

21. The system of claim 15, wherein the audio information module is further configured to monitor a position of the character in the game environment and to select an appropriate audio signal based on the position.

22. The system of claim 15, wherein the audio information module is further configured to monitor actions of the character in the game environment and to select an appropriate audio signal based on the actions of the character.

23. The system of claim 15, wherein the game software is configured to allow the user to disable the visual information module.

24. The system of claim 15, wherein the game software is configured to allow the user to disable the audio information module.

25. A computer-readable medium comprising instructions for providing game information to a user by performing:
- monitoring a position of a character in a game environment;
- providing visual information to the user based on the position of the character in the game environment, the visual information being presented as a modification of the character; and
- providing audio information to the user based on the position of the character in the game environment, the audio information being presented as statements from another character.

26. A system for providing game information to a user, comprising:
- means for monitoring a position of a character in a game environment;
- means for providing visual information to the user based on the position of the character in the game environment, the visual information being presented as a modification of the character; and
- means for providing audio information to the user based on the position of the character in the game environment, the audio information being presented as statements from another character.

* * * * *